Oct. 31, 1967  G. I. GOLDBERG  3,350,033
REACTION WHEEL SCANNER
Filed Oct. 21, 1965  2 Sheets-Sheet 1

GERALD I. GOLDBERG
INVENTOR

ATTORNEYS

Oct. 31, 1967     G. I. GOLDBERG     3,350,033
REACTION WHEEL SCANNER
Filed Oct. 21, 1965     2 Sheets-Sheet 2

GERALD I. GOLDBERG
INVENTOR

ATTORNEYS 3,350,033
REACTION WHEEL SCANNER
Gerald I. Goldberg, Silver Spring, Md., assignor to the United States of America as represented by the Administrator of the National Aeronautics and Space Administration
Filed Oct. 21, 1965, Ser. No. 500,435
26 Claims. (Cl. 244—1)

ABSTRACT OF THE DISCLOSURE

A satellite stabilization apparatus in which the function of a reaction wheel stabilizer and an optical horizon scanner are combined in a single device wherein the flywheel as an integral part of the reaction wheel produces the rotation of the scan means and where the stationary parts of the optical scanner are within the shaft of the flywheel and concentric thereto. A salient feature is the great efficiency afforded with respect to weight, power consumption, volume and reliability by elimination of gear trains, motors, bearings and other components.

---

The invention described herein may be manufactured and used by or for the Government of the United States of America for governmental purposes without the payment of any royalties thereon or therefor.

This invention relates to an orientation method and apparatus and more specifically to a means for orienting a space vehicle with respect to the earth. The invention employs a novel reaction wheel formed integrally with a scanning means for sensing infra-red radiation changes between earth and sky observations. The reaction wheel is employed to develop and store momentum.

Since an uncontrolled spacecraft will tumble erratically in orbit, means must be employed to stabilize the craft so that, for example, a sensor for a particular experiment may be pointed in a desired direction. Inertia wheels are one of several types of devices employed to stabilize or align spacecraft. An inertia wheel or a reaction wheel may be viewed as a servo motor with a large inertia rotor. The operation of reaction wheels is based upon Newton's third law of motion which states that for every action there is an equal and opposite reaction. To illustrate the law, a person stepping from a canoe (action) imparts an opposite motion (reaction) to the canoe. In a similar manner, if an electric motor is employed to increase the turning speed of a reaction wheel in one direction, an opposite torque or turning motion is imparted to the motor mount. The motor mount being coupled to the spacecraft structure causes the structure to move accordingly. By accelerating or decelerating the reaction wheel by varying the current to the motor, the attitude or orientation of the spacecraft can be controlled.

The command signal for reaction wheel operation may be self-generated by the spacecraft system or may be transmitted to the spacecraft from an external station. Depending upon the spacecraft mission, the spacecraft may be controlled from a sun sensor, a star tracker, an horizon scanner or a gyro platform.

Accelerating and decelerating the reaction wheel will permit many alignments of the spacecraft. However, the reaction wheel may reach its maximum allowed rotational speed and from then on, that reaction wheel can be employed to orient the spacecraft in one direction only, the direction obtained by decelerating the wheel since further acceleration of the wheel is not possible. The wheel must now be unloaded, or returned to a speed between its minimum and maximum. Thus, the maximum amount of angular momentum stored in the reaction wheel must now be reduced and this is accomplished by the application of an opposite torque to the spacecraft, for example, by reaction jets. The unloading speed and direction of rotation signal is obtained from a tachometer positioned within the reaction wheel unit.

Although the command for reaction wheel operation may originate with a number of systems as hereinbefore set forth, the present invention will be illustrated and described with reference to a horizon scanner. The scanner senses infra-red radiation changes between earth and sky observations and by manipulating this information, controls the current to the reaction wheel motor.

Heretofore, the reaction wheel and the scanner have been separate units which were highly inefficient with regard to weight, volume, power consumption, in comparison with the present invention. The present invention incorporates a unique construction wherein reaction wheel and scanner are formed as an integral unit thus reducing the number of motors required as well as effecting a great savings in weight, space, and power consumption. Certain elements of the scanner are coupled to the flywheel of the reaction wheel scanner and rotate due to the rotational energy imparted thereto.

Accordingly, it is the principal object of the present invention to improve methods and apparatus for orienting a free body.

It is a further object of the present invention to improve methods and apparatus for stabilizing or aligning a free body such as a spacecraft.

It is a further object of the present invention to reduce the weight, volume, and power consumption of apparatus employed to orient and stabilize a space vehicle.

It is a further object of the present invention to provide a reaction wheel incorporating its own scanner, in a single package, and when the device is employed in pairs, the reaction wheel is responsive to the scanner output to orient and stabilize the space vehicle.

It is a further object of the present invention to provide a plurality of inertia wheels, some of which employ a unique construction, where in the reaction wheel and horizon scanner are incorporated into a single package, the unique reaction wheel scanners being employed to derive outputs for pitch and roll correction signals and being capable of receiving an input correction signal to reorient the space vehicle about its respective axis.

It is a further object of the present invention to reduce the viscous drag of reaction wheel scanners by providing a construction wherein an air bearing is incorporated in the apparatus thereby eliminating the drag produced by lubricants and conventional bearings.

These and other objects of the present invention are accomplished by providing a reaction wheel and scanner of unitary construction (the reaction wheel and scanner are incorporated into a single package, the flywheel of the reaction wheel supplying rotary power to certain elements of the scanner), which when employed in pairs will provide information for deriving pitch and roll correction signals by sensing infrared radiation changes between earth and sky observation. The sensed information is employed to detect the earth horizon and thereby generate correction signals for orienting or aligning the space vehicle in a desired position.

In an illustrative environment set forth for the practice of the invention, the reaction wheel scanners are employed in pairs which derive information indicative of pitch and roll correction signals. After processing, the correction signal for roll reorientation is applied to the pair of reaction wheel scanners in the form of a varying current while the pitch correction is applied to a separate pitch reaction wheel. In a known manner, yaw information signals are derived from a gyro and after these signals are processed in a control logic box, correction signals are directed to a yaw reaction wheel which is similar to the pitch reaction wheel.

Since an uncontrolled space vehicle tumbles erratically in orbit, means must be employed to orient, stabilize and align the space vehicle at least during certain periods of the flight so that various experiments may be conducted and useful information derived. In systems of this type, the system weight, volume, and power consumption is of paramount importance in that these parameters must be maintained at a minimum. The reaction wheel scanner of the present invention meets all of these requirements. The use of a pair of reaction wheel scanners in place of two infrared horizon scanners and a separate reaction wheel reduces the number of motors required from three to two, and will reduce the number of bearings required which introduce viscous drag and produce other losses.

In the reaction wheel scanner, a prism and lens combination is centrally secured to a momentum flywheel surrounding a shaft, which in the particular embodiment illustrated is a hollow shaft, rotational energy being supplied by a pancake type of motor. The hollow shaft permits the stationary radiation sensor, in the form of a bolometer, to be in line with the rotating objects. The unit is housed in a sealed container with a germanium window. The reaction wheel scanner rotates in one direction only between a minimum and a maximum speed, which is the speed range that the infrared signal processor is capable of handling. The reaction wheel scanners are employed in back-to-back pairs such that when they are rotating in opposite directions at the same speed, there is no net momentum. As the reaction wheel scanners rotate, an error signal will ultimately be produced. To correct for the error, the reaction wheels of the reaction wheel scanners speed up or slow down to orient the spacecraft to the zero error position.

The invention both as to its organization and method of operation together with further objects and advantages thereof will best be understood by reference to the following specification taken in conjunction with the accompanying drawings in which.

Figure 4:
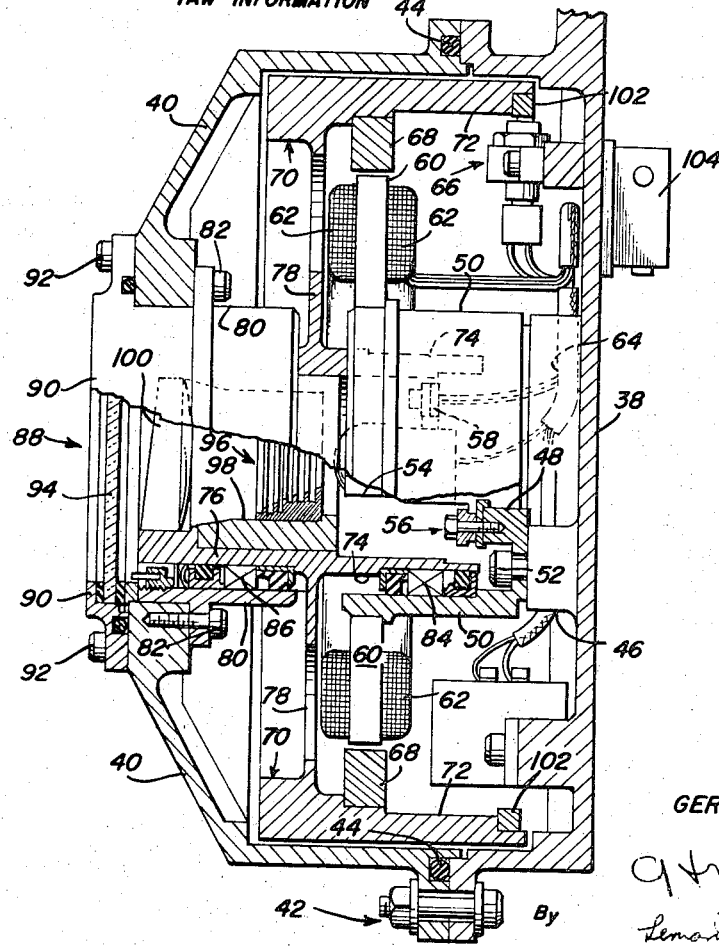
Figure 5:
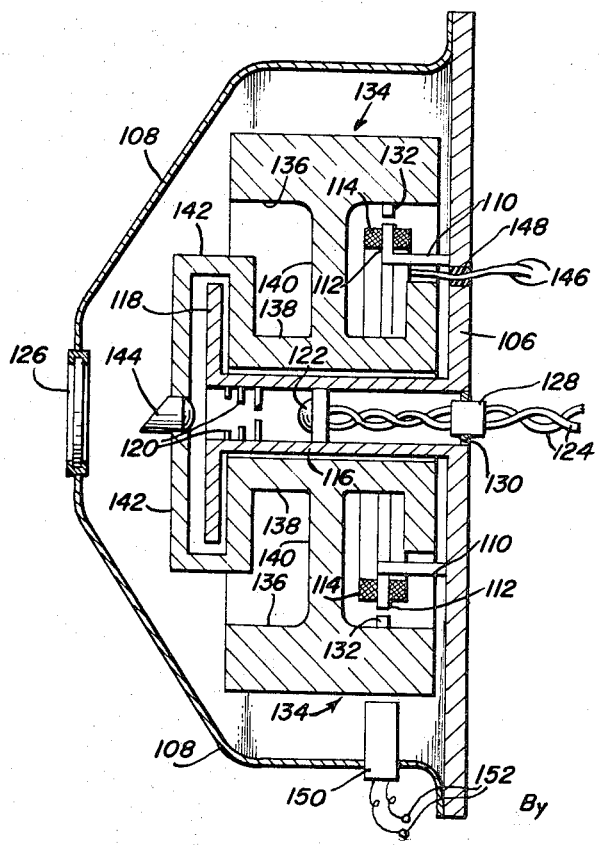

FIGURE 4 is a sectional view of a reaction wheel scanner and having the principal parts of a stator, a rotor-flywheel, and an optical system for the scanner portion; and FIGURE 5 is an elevational view of another embodiment of a reaction wheel scanner, the major difference from the embodiment of the FIGURE 4 being that the usual bearings have been eliminated and an air bearing is incorporated in the apparatus.

Figure 1:
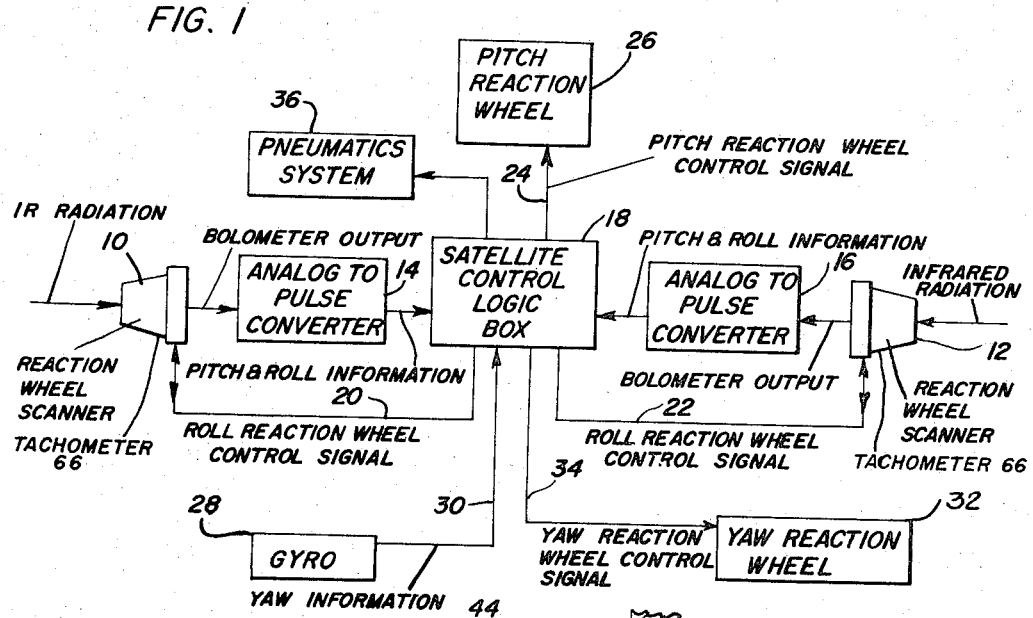
FIGURE 1 is a block diagram of an illustrative environment in which the reaction wheel scanners of the present invention may be utilized.

FIGURE 1 illustrates an example of a complete system incorporating the novel reaction wheel scanner of the present invention and for attaining stabilization and orientation of a free body about pitch, roll and yaw axes. If a reaction wheel (or wheels) assigned to control a particular axis is secured to the body, the variation of current to the reaction wheel will cause more or less momentum to be stored in the flywheel of the reaction wheel so that the reaction wheel through its coupling with the spacecraft, will orient the spacecraft or body about its particular assigned axis.

More specifically, a first reaction wheel scanner 10 and a second substantially identical reaction wheel scanner 12 forming the salient teaching of the present invention are disposed about the roll axis of the body and operate in diametrically opposed pairs. The reaction wheel scanners 10 and 12 are rotated in opposite directions so that when their speed is equal, there is no net momentum. As the reaction wheel scanners sense an error, to be hereinafter described, the reaction wheel scanners 10 and 12 speed up or slow down so as to reorient the spacecraft about its roll axis and to the zero error position.

Infrared radiation is received by the optics system, to be hereinafter described, of each of the reaction wheel scanners 10 and 12 and a bolometer within the scanners 10 and 12 produces an output proportional to the infrared radiation incident upon the scanner. The bolometer output from the reaction wheel scanner 10 is supplied to an analogue to pulse converter 14 while the output from the reaction wheel scanner 12 is supplied to an analogue to pulse converter 16. The analogue to pulse converters 14 and 16 converts the analogue output of the bolometers to a pulse representation of the magnitude of the signal. The outputs from the analogue to pulse converters 14 and 16 can now be employed to determine pitch and roll orientation so as to derive correction signals in a satellite logic box 18 which will now be described with reference to the FIGURES 2 and 3.

Figure 2:
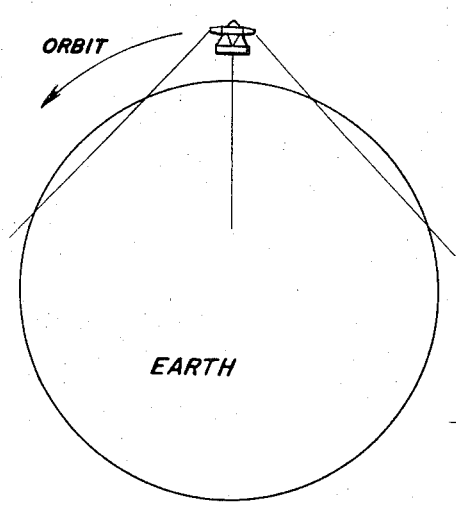
FIGURE 2 is an elevational schematic view of a spacecraft in orbit about the earth and illustrating the scanning pattern as viewed by the spacecraft optics.
Figure 3:
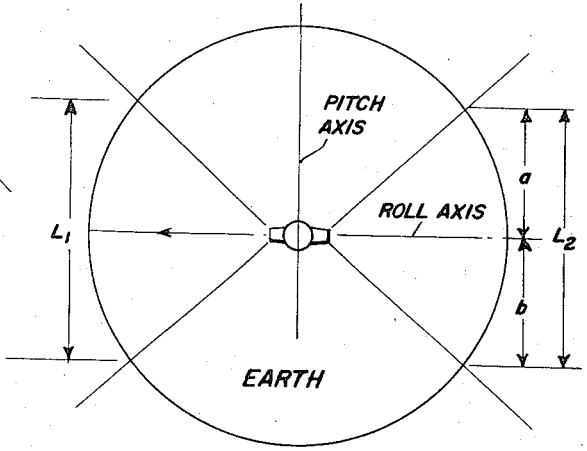
FIGURE 3 is a schematic plan view of the satellite or space vehicle of the FIGURE 2 and illustrating the measurements which are derived by the reaction wheel scanners to provide pitch and roll correction signals.

In the FIGURES 2 and 3, schematic views of a satellite in orbit about a planet such as Earth are illustrated and the optical scanners in the reaction wheel scanners 10 and 12 traverse in area so as to detect the earth's horizon by sensing the infrared radiation changes between earth and sky observations. The "a" and "b" pulse signals, received from the bolometers and directed to the control logic box 18 via the analogue to pulse converters 14 and 16, are proportional to the distances "a" and "b" illustrated in the FIGURE 3. The pulse lengths of the "a" and "b" signals are compared and the resulting difference signals are determined by operating on $L_1$ and $L_2$ signals. Each scanner electronics passes a signal representative of $L_1$ and $L_2$ of the FIGURE 3 to the control logic box 18 and a difference signal is derived. The control logic box 18 receives an output from tachometer 66 during each revolution of the flywheel. The positional relationship of the tachometer pickoff, is established when the reaction wheel scanner is mounted on the satellite so that the tachometer output signal identifies the instant in which the scan is directed perpendicular to the plane formed by the pitch and roll axis of the satellite. This tachometer signal, which may be a pulse, therefore serves as the local vertical reference of the satellite. Accordingly, it can be seen, that a signal which occurs at the time the optical scan is on the local vertical serves to divide the $L_1$ or $L_2$ signal into its "a" and "b" components utilized for the roll stabilization control function. The circuitry in the control logic box 18 then averages the two difference signals (between the "a" and "b" signals from the two scanner electronics) and applies a signal in accordance therewith to both the reaction wheel scanners 10 and 12 via the conductors 20 and 22, respectively, to vary the current to the reaction wheel scanners 10 and 12 so that they will function at the desired speed level so as to torque the spacecraft to the proper attitude about the roll axis. It is to be understood that in order to develop the roll error signals it is not necessary that the tachometer output be adjusted to occur exactly on the vertical reference, and that other arrangements are possible. For example, in discrete type tachometers, as long as the angular displacement of the tachometer from the satellite local vertical is known (displacement can be determined by measurements during manufacture and the information can be stored in the satellite control logic box), and as long as the reaction wheel speed is available, it is seen that a signal can be generated which depicts that instant when the optical scan is along the local vertical.

In like manner, the difference signal representing the difference between the $L_1$ and $L_2$ signals is applied via a conductor 24 to a pitch reaction wheel 26, as shown in the FIGURE 1.

A gyro 28 of the FIGURE 1 and of known construction, supplies yaw information via a conductor 30 to the circuitry of the satellite control logic box 18 which then generates the proper signal to a yaw reaction wheel via a conductor 34 to torque the spacecraft about the yaw axis.

A pneumatic system 36 of the FIGURE 1 is illustrated in block form and comprises a gas supply, solenoids, and gas jets (all of which are not shown) which are employed to unload momentum from any of the four reaction wheels 10, 12, 26 and 32 when the wheels reach their maximum speed. The gas jets are fired in such a direction so that their thrust will torque the spacecraft in the direction which will cause the reaction wheels to reduce their speed. The system is a closed loop servo system in which the reaction wheel and reaction wheel scanner speed are fed back to the attitude computer in the control logic box 18 so that the reaction wheel scanners 10 and 12, the pitch reaction wheel 26 and the yaw reaction wheel 32 are constantly controlled. Other methods for unloading the wheels, such as gravity gradient or magnetic torque may be used instead of gas jets.

One embodiment of a reaction wheel scanner is shown in the FIGURE 4 while a second embodiment is illustrated in the FIGURE 5. Although similar functions are performed by both reaction wheel scanners and either embodiment will operate successfully in the apparatus set forth in the FIGURE 1, the major difference is that the reaction wheel scanner of the FIGURE 4 employs a type of roller or ball bearing and the reaction wheel scanner of the FIGURE 5 employs an air bearing. It is therefore intuitively clear that the viscous drag of lubricants and bearings present in the embodiment of the FIGURE 4 have been eliminated from the embodiment of the FIGURE 5. Further advantages will be set forth with reference to that figure.

With reference to the FIGURE 4, the reaction wheel scanner includes a base member 38 and an enclosing housing 40 which is secured to the base member 38 by any convenient means such as indicated at 42, a seal being effected between the base member 38 and the housing 40 by an O-ring 44, as shown. A plurality of bosses, one of which is shown at 46, are employed to support an annular structure having an inner ring 48 and an outer ring 50. In the depression between the inner ring 48 and the outer ring 50, a plurality of studs, such as the stud at 52 are employed to secure the annular structure comprised of the inner ring 48 and the outer ring 50 to the bosses 46. A bolometer 54 is secured to the inner ring 48 by any suitable means such as that shown at 56. In addition, a temperature sensor 58 shown in dotted outline may be secured to the bracket which supports the bolometer 54.

The outer ring 50 of the reaction wheel scanner illustrated in the FIGURE 4 supports an annular core 60 upon which a plurality of windings are positioned to form a motor stator 62 which is supplied current from a pair of conductors harnessed in a group of conductors 64. The conductors 64 also include individual conductors to the bolometer 54, the temperature sensor 58, and to a tachometer 66, for measuring the revolutions per unit time of the flywheel, to be hereinafter described.

Surrounding the core 60 and the stator 62 is a motor rotor 68 which is secured to a flywheel 70. The flywheel 70 is of any heavy material, such as stainless steel, in order that sufficient momentum can be stored in the flywheel 70 to perform its orientation function about its respective axis. The flywheel 70 includes a flat cylindrical section 72 which rotates adjacent the housing 40. In addition, the flywheel 70 includes a circular centrally positioned sleeve or hub having a rightward projection 74 and a leftwardly projecting section 76, as viewed in the FIGURE 4. The projecting sleeves 74 and 76 are joined to the cylindrical section 72 by an annular web 78. In the preferred embodiment, the flywheel 70 is of unitary construction and includes the cylindrical section 72, the web 78, and the sleeve projections 74 and 76.

A trunnion or axial sleeve 80 is substantially aligned with the outer ring 50 and secured to the fore part of the housing 40 by a plurality of studs such as those at 82. The outer ring 50 and the rightward projection 74 cooperate through a bearing 84 to provide one rotary support for the flywheel 70 while the leftward projection 76 of the flywheel 70 cooperates through a bearing 86 and the trunnion 80 to provide the other rotary support for the flywheel 70. Suitable seals are provided adjacent the bearings 84 and 86, as shown.

With continued reference to the reaction wheel scanner of the FIGURE 4, a window 88 is axially positioned upon the housing 40 and includes an annulus 90 secured to the housing 40 by a plurality of studs 92. The annulus 90 houses a germanium window 94 which is seated in the annulus 90 between a pair of resilient sealing members, as shown in cross-hatched section.

Whereas the germanium window 94 and the bolometer 54 are stationary with respect to the base member 38 and the housing 40, certain elements of the optical system rotate along with the flywheel 70. These elements are an optical baffle 96 which is seated within a sleeve 98, the sleeve 98 fitting within the inner surface of the leftward projection 76 of the flywheel 70. In addition, a lens and prism arrangement 100 is mounted within the leftward projection 76 at its leftmost extremity and close to the germanium window 94. The germanium window 94 passes infrared radiation to which it is exposed and through the cooperation of the rotating optical baffle 96 and the lens 100, the radiation is focused upon the bolometer 54 so that the bolometer 54 provides an electrical output indicative of the intensity of the radiation being directed to it.

Thus, the rotating elements of the reaction wheel scanner of the FIGURE 4 are the rotor 68, the flywheel 70 including the rightward projection 74 and its leftward projection 76, the sleeve 98, the optical baffle 96 and the lens 100. The revolutions of the flywheel 70 may be determined by the tachometer 66, previously described, which senses the rotary motion through a ring 102 embedded in the flywheel 70 immediately adjacent the tachometer 66. The electrical conductors for performing the various functions within the reaction wheel scanner and their outputs are coupled to any external apparatus through a connector 104, as shown. In addition, a valve, not shown, may be employed which leads from the outside to the inside of the reaction wheel scanner so that the atmosphere within the reaction wheel scanner may be maintained at a desired pressure or type of fluid other than air.

Thus, one of the salient features of the invention is clearly visible in that the reaction wheel and the scanner have been combined into a single structure with the flywheel of the reaction wheel providing the rotary motion for the optical assembly which requires rotation. In this manner, the effective momentum of the flywheel is increased due to the addition of the additional weight produced by the rotating optical element.

Whereas the reaction wheel scanner of the FIGURE 4 employs conventional, although perhaps modified, bearings between the flywheel and stationary elements, the reaction wheel scanner of the FIGURE 5 is a hydrodynamic gas bearing reaction wheel scanner. A base member 106 has a housing 108 of generally circular configuration secured along its outer edge in any convenient manner. An annulus 110 is secured to the base member 106 and supports an outwardly directed ring 112 which forms the core for the stator windings 114. A hollow shaft 116 is secured to the base member 106 and extends axially to a circular flange 118 secured to the shaft 116 at its free end. Within the shaft 116 and toward the leftmost end of the shaft is positioned an optical baffle 120 which is aligned with a bolometer 122 having a pair of output conductors 124.

A window 126 which may be of germanium is supported by the housing 108 and in axial alignment with the baffle 120 and the bolometer 122. A connector 128 permits the conductors 124 to pass through the base member 106 and a seal is effected between the connector 128 and the base member 106 by an "O" ring 130.

Whereas the foregoing described elements of the reaction wheel scanner of the FIGURE 5 are stationary, the remaining elements to be described rotate with respect to these elements. For example, a rotor 132 is embedded in a flywheel 134 having an outer ring 136 joined to an inner ring 138 by a web 140. The inner ring 138 of the flywheel 134 is enlarged into a flat circular configuration 142 encasing the flange 118. A lens 144 is axially mounted within the configuration 142 and in alignment with the window 126 and the bolometer 122.

Current is supplied to the stator 114 by a pair of conductors 146 which pass through a grommet 148 positioned in the base member 106. A magnetic tachometer 150 is positioned through the housing 108 and juxtapose the flywheel 134. A pair of conductors 152 are coupled from the tachometer 150 so that the current induced in the tachometer 150 may flow in the conductors 152.

Thus, a hydrodynamic gas bearing is formed between the inner ring 138 of the flywheel 134 and the shaft 116 which provides a number of advantages when employed with a hydrodynamic gas bearing reaction wheel scanner. Certain of these advantages are greatly improved operating life and reduced power consumption. This unique device, which incorporates a specially designed hydrodynamic gas bearing in place of the ball or roller bearings used in the reaction wheel scanner of the FIGURE 4, eliminates the viscous drag due to bearing lubricant. It is this viscous drag which is the prime consumer of operating power. A reaction wheel scanner is ideally suited to the use of a hydrodynamic gas bearing since the operation is continuous with no anticipated starts or stops while the spacecraft is in orbit. The expected bearing life of this invention is infinite under operating conditions. The unique characteristics of the gas bearing mated with the proper motor design will allow the reaction wheel scanner to operate at optimum efficiency.

In summary, the present invention employs a pair of novel reaction wheel scanners along with a pair of reaction wheels for sensing a predetermined condition, such as the infrared radiation changes between earth and sky observations, and employing the information so sensed to orient a free body, such as a spacecraft, about its pitch, roll and yaw axes. The terminations performed by the scanners of the reaction wheel scanners are sufficient for determining any pitch or roll errors. If a correction is required, the reaction wheel scanners are employed in pairs to provide roll correction and the pitch correction is applied to a pitch reaction wheel. A gyro is utilized along with a yaw reaction wheel for effecting yaw corrections. A pneumatic system is utilized to unload the reaction wheels and the reaction wheel scanners.

A salient feature of the invention is the construction of the reaction wheel scanners wherein a reaction wheel is combined with a scanner in a single package. Two embodiments are set forth wherein the first embodiment employs ball or roller bearings for the flywheel and the second embodiment employs a hydrodynamic gas bearing which theoretically permits infinite bearing life under operating conditions. The optical system of the reaction wheel scanners is mounted concentric with the reaction wheel so that no other motive power is necessary for providing rotary motion to the scanner since the scanner receives its necessary rotary motion due to its coupling to the flywheel of the reaction wheel.

Thus, the present invention may be embodied in other specific forms withuot departing from the spirit and the essential characteristics of the invention. The present embodiment is, therefore, to be considered in all respects as illustrative and the scope of the invention being indicated by the appended claims rather than the foregoing description, and all changes which come within the meaning and range of the equivalency of the claims are, therefore, intended to be embraced therein.

What is claimed is:

1. Apparatus for orienting a free body about pitch, roll and yaw axes which includes means for deriving pitch and roll error signals, means for deriving a yaw error signal, control means for receiving said error signals to provide pitch, roll and yaw correction signals, and individual means each for receiving a correction signal to reorient said body about its respective axis, said means for deriving pitch and roll error signals and for reorienting said body about its roll axis comprising the improvement of a reaction wheel scanner means wherein said scanner means is concentric with said reaction wheel.

2. The apparatus as defined in claim 1 wherein said reaction wheel scanner means includes a pair of reaction wheel scanners functioning in opposed relationship.

3. The apparatus as defined in claim 1 including means for unloading said reaction wheel scanner means upon said scanner means reaching a predetermined condition.

4. Apparatus for orienting a free body about pitch and roll axes which includes means for deriving pitch and roll error signals, control means for receiving said error signals to provide pitch and roll correction signals, means for receiving said pitch correction signal to reorient said body about its pitch axis, and means for receiving said roll correction signal to reorient said body about its roll axis, said last-named means comprising the improvement of at least one reaction wheel for reorienting said body and a scanner concentric with said reaction wheel for observing a predetermined condition to provide signals to said means for deriving pitch and roll error signals.

5. The apparatus as defined in claim 4 wherein said means to reorient said body about its roll axis includes the improvement of a pair of reaction wheel scanners rotating in opposite directions about the same axis.

6. The apparatus as defined in claim 4 wherein said scanner is an optical scanner responsive to infrared radiation.

7. The apparatus as defined in claim 6 wherein said optical scanner includes a bolometer and a rotating lens and optical baffle coupled to and driven by said reaction wheel.

8. Apparatus for orienting a free body about a first axis and a second axis which includes a pitch reaction wheel for controlling the orientation about the first axis and a first and a second reaction wheel scanner for controlling the orientation about the second axis, and means for providing correction signals to said pitch reaction wheel and said first and second reaction wheel scanners, each of said reaction wheel scanners including a reaction wheel for performing the orientation and a scanner concentric with said reaction wheel for deriving position signals for application to said means for providing correction signals.

9. The apparatus as defined in claim 8 wherein said scanner includes focusing means and means responsive to infrared radiation, said focusing means being coupled to and driven by said reaction wheel.

10. The apparatus as defined in claim 9 wherein said focusing means includes a rotatable lens and optical baffle.

11. The apparatus as defined in claim 8 including means for unloading said reaction wheel and said reaction wheel scanners when predetermined conditions are established.

12. Axial orientation means comprising a reaction wheel scanner with efficient variable speed characteristics and means receptive to signals from said reaction wheel scanner for orientating said reaction wheel scanner about its axis, said means receptive to signals comprising signal converter means with characteristics to accommodate the variable speeds of the reaction wheel scanner, said reaction wheel scanner comprising a flywheel rotor, a stator adjacent said rotor, and scanning means concentric with said rotor for generating signals to said means for orientating said reaction wheel scanner.

13. The means as defined in claim 12 wherein said scanning means is responsive to infrared radiation.

14. The means as defined in claim 12 wherein said scanning means includes a lens and optical baffle driven in rotary engagement with said flywheel rotor.

15. A reaction wheel scanner comprising a flywheel rotor, a stator adjacent said rotor, and scanning means juxtaposed said flywheel rotor for deriving signals to control the current to said stator wherein said scanning means is concentric with said rotor and stator, portions of which are driven by said flywheel rotor.

16. A reaction wheel scanner comprising a base member, a centrally positioned axial sleeve extending from said member, a stator supported from the outer surface of said sleeve, a rotor surrounding said stator, a flywheel surrounding said rotor and secured thereto, said flywheel including a circular web formed integrally therewith and an inner sleeve formed on said web and oppositely directed from said web, a portion of said inner sleeve projecting into said axial sleeve and journaled for rotation therein, a housing surrounding said flywheel and secured to said base member, said housing having an inwardly directed trunnion secured thereto and surrounding a portion of said inner sleeve, on a side opposite of said web which projects into said axial sleeve, said portion of said inner sleeve being journaled for rotation in said trunnion.

17. The combination as defined in claim 16 including sensing means positioned within said inner sleeve.

18. The combination as defined in claim 17 wherein said sensing means includes a rotating lens and optical baffle for directing radiant energy upon a stationary bolometer.

19. The combination as defined in claim 18 including a germanium window in axial alignment with said lens, baffle and bolometer and secured to said housing.

20. A reaction wheel scanner comprising a base member, a centrally positioned axial sleeve extending from said base member, a stator supported from the outer surface of said sleeve, a rotor surrounding said stator, a flywheel surrounding said rotor and secured thereto, said flywheel including a circular web formed integrally therewith and an inner sleeve formed on said web and having a first portion projecting from one side of said web and into said axial sleeve and a second portion projecting from the opposite side of said web, a housing surrounding said flywheel and secured to said base member, said housing having an inwardly directed trunnion secured thereto and surrounding said second portion of said sleeve, bearing means surrounding said first and second portions of said sleeve and engaging, respectively, the inner surfaces of said axial sleeve and said trunnion for permitting rotation of said flywheel and rotor, a bolometer positioned within said first portion of said sleeve, a lens and baffle secured within said second portion of said sleeve, and a germanium window in axial alignment with said inner sleeve and secured to said housing.

21. The combination as defined in claim 20 including means for sensing the rotation of said flywheel.

22. The combination as defined in claim 20 including temperature sensing means positioned adjacent said bolometer.

23. A reaction wheel scanner comprising a base member, a hollow axial shaft extending therefrom, a stator surrounding said shaft and secured to said base member, a flywheel surrounding said shaft, the inner surface of said flywheel and the outer surface of said shaft forming a fluid bearing, a rotor surrounding said stator and secured to said flywheel, optical sensing means positioned within said hollow shaft, and a lens secured for rotation to said flywheel and focused upon said sensing means.

24. The combination as defined in claim 23 including a housing surrounding said flywheel and secured to said base member, and a germanium window supported by said housing and aligned with said lens and sensing means.

25. The combination as defined in claim 23 including pick-up means for sensing the revolutions of said flywheel.

26. A reaction wheel scanner comprising a base member, a hollow axial shaft extending therefrom, a stator surrounding said shaft and secured to said base member, a flange secured to the free end of said shaft, a flywheel surrounding said shaft and flange, the inner surface of said flywheel and the outer surface of said shaft forming a fluid bearing, a rotor surrounding said stator and secured to said flywheel, optical sensing means positioned within said hollow shaft, a lens secured for rotation to said flywheel and focused upon said sensing means, pick-up means for sensing the revolutions of said flywheel, a housing surrounding said flywheel and secured to said base member, and a germanium window supported by said housing and aligned with said lens and sensing means.

References Cited
UNITED STATES PATENTS

| | | | |
|---|---|---|---|
| 2,462,925 | 3/1949 | Varian | 33—61 X |
| 2,963,973 | 12/1960 | Estey | 244—3.16 |
| 3,235,204 | 2/1966 | Lee | 244—1 |

FERGUS S. MIDDLETON, *Primary Examiner.*